United States Patent [19]

Cutter

[11] Patent Number: 4,598,123
[45] Date of Patent: Jul. 1, 1986

[54] IMPACT MODIFIED METHYL METHACRYLATE POLYMER

[75] Inventor: Louis A. Cutter, Allegheny County, Pa.

[73] Assignee: Unites States Steel Corporation, Pittsburgh, Pa.

[21] Appl. No.: 729,458

[22] Filed: May 1, 1985

Related U.S. Application Data

[63] Continuation-in-part of Ser. No. 513,546, Jul. 14, 1983, abandoned.

[51] Int. Cl.$^4$ .................. C08L 33/12; C08L 51/04; C08L 53/02
[52] U.S. Cl. ..................... 525/84; 525/310; 525/309; 525/901; 525/263
[58] Field of Search ............ 525/310, 901, 84

[56] References Cited

U.S. PATENT DOCUMENTS

| | | | |
|---|---|---|---|
| 4,007,311 | 2/1977 | Harlan | 428/246 |
| 4,080,406 | 3/1978 | Kelsey | 525/310 |
| 4,212,958 | 7/1980 | Falk | 525/310 |
| 4,287,317 | 9/1981 | Kitagawa et al. | 525/310 |

OTHER PUBLICATIONS

Manson et al.—Polymer Blends & Composites, "Oxidation and Weathering of Polyblends", pp. 117–119, 1976.

*Primary Examiner*—Carman J. Seccuro
*Attorney, Agent, or Firm*—William L. Krayer

[57] ABSTRACT

A clear, cast acrylic sheet of improved impact strength may be prepared by dispersing or dissolving 8–14% of an ABA block copolymer, (where A is styrene, B is a hydrogenated butadiene, containing a large 1-2 butadiene fraction) in a methyl methacrylate casting mixture which contains 0.1–20% styrene, and polymerizing in sheet form by heating with free-radical initiators.

7 Claims, No Drawings

IMPACT MODIFIED METHYL METHACRYLATE POLYMER

This application is a continuation-in-part of co-pending application U.S. Ser. No. 513,546, filed July 14, 1983, now abandoned.

BACKGROUND OF THE INVENTION

Polymethylmethacrylate is a strong, optically clear, weather-resistant polymer, but as conventionally made by free-radical polymerization, either in the presence or absence of cross-linkers, is quite brittle and deficient in impact strength. For that reason, its use is limited to applications in which only very modest impact strength is required. To increase its range of application, polymethylmethacrylate should have high impact strength and should include qualities of resistance to ultraviolet and visible radiation and oxidative degradation in order to provide weatherability.

The highest quality polymethylmethacrylate sheet with the smoothest surface is made by a casting process, in which the methyl methacrylate monomer is polymerized either batchwise in a cell or continuously between two continuous belts. A readily castable high-impact polymethylmethacrylate composition of good weatherability is needed in the art.

Co-pending application U.S. Ser. No. 661,831 describes the preparation of a grafted acrylic copolymer in emulsion which can be dried, dispersed in a mixture of acrylic monomers, and cast to produce a sheet with enhanced impact strength and good weatherability. The amount of modifier that can be incorporated in this way is severely limited by the maximum practical viscosity of the casting mixture, and for that reason the impact strength attainable is also limited. See also U.S. Pat. No. 3,793,402, which describes preparation of impact-modified polymethylmethacrylate by extrusion blending a graft emulsion polymer with a polymethylmethacrylate/ethyl acrylate molding powder. It also describes casting of the molding powder after sheeting a mixture of emulsion polymer powder with a methyl methacrylate/ethyl acrylate monomer mixture and initiator on a cold roll mill. This casting procedure presents severe difficulties in implementation in casting operations because of the very high viscosity of the monomer/graft polymer mixture.

A second inherent limitation of conventional acrylic modifiers is in maintaining impact strength at low temperatures, because of their relatively high glass transition temperatures.

Other high-impact acrylic resins modified with polybutadiene and/or styrene-butadiene have been described. See U.S. Pat. Nos. 2,857,360, 3,029,222, and 3,261,887. Because of the unsaturated carbon linkages, these are more susceptible to oxidation and weathering than polymer modified with acrylic rubber, as pointed out by Manson et al, "Polymer Blends and Composites", pp. 117–119, Plenum, NY (1976).

Ethylene-propylene or ethylene-butylene rubbers offer possibilities for combining glass transition temperatures lower than those of acrylic rubbers with weatherability. A difficulty with these materials is in making a stable dispersion of appropriate particle size (0.2-5 microns) for maximum impact strength, since they are not readily compatible with polymethylmethacrylate, or soluble in the monomer.

In addition to the above-mentioned U.S. Pat. No. 3,793,402, the reader may be interested in reviewing Yusa et al U.S. Pat. No. 3,922,321, which recites improvements in weatherability as well as impact strength; however, contrary to the solution to the problem offered by the applicant herein, Yusa et al employ a methyl methacrylate-grafted butyl acrylate/styrene, a different material entirely. Also of interest will be various patents to Gergen and Davison, i.e. U.S. Pat. Nos. 4,085,163 (see col. 18, line 58), 4,081,424 (col. 19, line 50), 4,111,894; 4,110,303 and 4,102,854; however, those disclosures which mention methacrylates utilize them only as more or less incidental comonomers in the specifically described nitrile barrier resins. The Lunk U.S. Pat. No. 3,810,957 may also be of interest for its recitation of various impact modifiers for use in thermoplastics.

The use of styrene-(ethylene-butene-1)-styrene block copolymer as an addition for scrap blends of polystyrene and polypropylene is described in the December, 1981 issue of Modern Plastics, pp. 60–62.

Kelsey in U.S. Pat. No. 4,080,406 discloses transparent high-impact compositions obtained by polymerizing a mixture of methyl methacrylate, higher methacrylates and styrene with styrene-butadiene block copolymer and/or polybutadiene. Here the unsaturation in the rubber provides a source of good grafting sites, helpful in stabilizing the rubbery phase during polymerization and subsequent processing but detrimental to weatherability. Harlan, Jr. in U.S. Pat. No. 4,007,311 describes the polymerization of acrylates or methacrylates with styrene-butadiene-styrene block copolymers by polymerizing methylmethacrylate in the presence of peroxides, also analogous reactions when the butadiene portion of the block has been hydrogenated, and their use in adhesives. Falk in U.S. Pat. No. 4,212,958 discloses the preparation of graft/polyblend compositions by polymerizing acrylic esters in the presence of saturated rubbers, including ethylene-propylene rubber, hydrogenated styrene-butadiene blocks, and hydrogenated polybutadiene with benzoyl peroxide in emulsion and solution. The polymers were used as flow and impact modifiers for PVC. Kitagawa et al in U.S. Pat. No. 4,287,317 disclose a continuous process for producing impact-modified polymethylmethacrylate, using saturated or unsaturated rubbers involving the preparation of a prepolymer syrup with dispersed rubber particles, which can subsequently be cast to produce an impact-modified polymethylmethacrylate. Moran in U.S. Pat. No. 4,097,555 discloses a method for producing transparent, high impact compositions containing an alkenyl aromatic-alkenyl nitrile acrylic matrix and styrene-butadiene-styrene block copolymer as a rubbery phase (unsaturated).

SUMMARY OF THE INVENTION

My invention includes cast acrylic forms, made predominantly of polymethylmethacrylate, impact-modified with a block copolymer of ABA structure where A is polystyrene and B is a hydrogenated polybutadiene rubber, methods of making such polymeric forms, and the syrups from which they are made. The ABA block copolymers I use are presently made by the complete or nearly complete hydrogenation of the polybutadiene portion of polystyrene-polybutadiene-polystyrene block copolymers containing a large 1-2 butadiene fraction, i.e. having a weight ratio of styrene to rubber of about 1:2 to about 1:3 (see U.S. Pat. No. 4,107,130).

The polybutadiene block should have contained originally, prior to hydrogenation, at least about 10% 1,2 isomer of butadiene. Commercial examples of such polymers are Kraton G1650, Kraton G1651, and Kraton G1652. Of these, the higher molecular weights, e.g. at least 70,000 are preferred. Hydrogenation is accomplished catalytically by methods known to the art, for example as described in U.S. Pat. No. 3,595,942. The amount of the impact modifier is critical, and for maximum impact strength should be at least 8 percent by weight of the finished product and preferably as much as can be conveniently and controllably dispersed in the monomeric methyl methacrylate casting mixture and cast, e.g. up to about 14 percent using current commercial techniques, preferably about 10 to about 14 percent or more. Dispersion can be conducted at room temperature, or by solution at about 60° C. When dispersed in this way, Kraton G1650 can yield a casting with a dispersion of rubber particles in the 1-5 micron particle-size range, satisfactory for impact strength. In addition to the styrene/hydrogenated butadiene block copolymer, a different rubber containing little or no olefinic unsaturation, such as ethylene-propylene rubber or ethylene-propylene-butadiene rubber may be included in the casting mixture to further increase impact strength. In the presence of the graft copolymer, the rubber can be dispersed much more effectively in the monomer mixture. Added rubber in the range 4-10 percent of the total casting mixture can materially improve the impact strength. The casting mixture is predominantly methyl methacrylate but may contain other acrylates or methacrylates which will copolymerize with it, as well as styrene, cross-linkers, chain transfer agents, release agents, ultraviolet light screening agents, and antioxidants, as is known in the art.

Free radical initiators are required for the polymerization to take place. The concentration of free radical initiator and temperature is quite critical to the impact properties of the cast sheet and should be chosen so that the maximum exothermic heat of reaction is not delayed beyond about 80 minutes; the mixture should contain at least 0.2% peroxide or peroxyester initiators with a 10-hour half-life in the range of 25°-105° C. and a 1-minute half-life in the range 75°-160° C. Suitable initiators include for example t-butyl peroxyneodecanoate, t-butyl peroxypivalate, decanoyl peroxide and lauroyl peroxide, but are not restricted to them. By half-life, I mean the time required for half of the initiator to undergo thermal decomposition at a given temperature.

The presence of styrene copolymerized with the methyl methacrylate makes it possible to match refractive indices between the rubber phase and the polymethylmethacrylate matrix to make a clear sheet. Styrene also causes the impact strength to increase dramatically. For clarity, the styrene content should be in the range 0.1-20 percent, preferably 4-8 percent, of the casting mixture (syrup). Impact strength is enhanced when 5-11 percent styrene is copolymerized. Thus, my preferred concentration of styrene is about 5-8% for a clear sheet with high impact properties.

Cross-linkers such as polyethylene glycol dimethacrylate may be added to enhance hardness and tensile modulus. A mercaptan such as n-dodecyl mercaptan may be included to achieve a lower-molecular-weight moiety in the matrix. Inclusion of n-dodecyl mercaptan, about 0.15 percent, in the formulation, however, results in a product of very low strength; the amount should therefore be kept to the minimum dictated by processing requirements.

The inclusion of butyl acrylate in the copolymer lowers impact strength and tensile strength, tensile modulus, hardness, heat distortion temperature, and Vicat. Its level should be kept to the minimum consistent with thermoformability.

The inclusion of ultraviolet light screening agents and antioxidants is advantageous to improve the thermal stability and weatherability of the sheet. Suitable light screening agents include substituted benzotriazoles such as 2(2-hydroxy 5 methyl phenyl) benzotriazole, 2(2-hydroxy 5-t-octyl phenyl benzotriazole) and substituted benzophenones. These may be present in amounts up to about 1 percent of the formulation. Antioxidants include hindered phenols which confer protection without serious discoloration on heating: for example, 2,6 ditert butyl 4 methyl phenol. Also more highly substituted derivatives of lower vapor pressure such as octadecyl 3-(3',5' ditert butyl - 4' hydroxyphenyl) propionate, may be present in amounts up to about 1 percent of the cast sheet.

In the following examples, the preparation of the cast sheet involves three processing steps:

1. Dispersion of the polymer in the monomers a. All monomers are mixed in a stirred vessel at room temperature and the block copolymer added and dispersed until the mixture is uniform and free of lumps. At this point the free radical initiators are added to the casting mixture and stirred until well mixed.

b. Alternatively, the monomers (not including cross-linkers), graft polymer, and a small amount of phenolic polymerization inhibitor (0.005-0.02%) are heated to a temperature where the graft polymer will dissolve in the monomer mixture and significant polymerization does not occur (50°-70° C.) and stirred until the graft polymer is dissolved. If additional saturated rubber is to be dispersed in the casting mixture, it is added at this point, and stirred until dispersion is complete. The mixture is cooled to 30° C. or less, and difunctional monomeric cross-linkers, antioxidants, light stabilizers, release agents, and free radical initiators, are added and mixed thoroughly.

2. Degassing

The mixture is then degassed under a vacuum (absolute pressure not more than 125 Torr), for at least 15 minutes. (This step is necessary only if it is desirable to avoid the formation of bubbles in the sheet.)

3. Casting

The mixture from step 2 is filtered to remove lumps and cast between two smooth surfaces, typically 0.05-0.5 inches apart depending on the desired thickness of the sheet, preferably highly polished stainless steel. The casting operation may be batch or continuous, with the sheet maintained under conditions of temperature and pressure (approximately one atmosphere) so that essentially complete polymerization occurs in the time allotted and at the same time, the monomer mixture is prevented from boiling, and bubbles do not appear in the finished sheet. Heat is added to the sheet to bring the syrup to polymerization temperature and removed during the polymerization to control the temperature in the desired range. Water baths, water sprays and hot air are conveniently used as heat transfer media in the polymerization, applied to the outer wall of the polymerization space. In a batch operation syrup (preferably degassed) is poured into a chamber consisting of a pair of parallel plates separated by a gasket, with heat added or removed through the outer wall of the plates by a heat transfer fluid (usually air, water or both).

In a continuous process, the syrup is placed between two carefully spaced, essentially horizontal, moving endless belts gasketed at the edges. Heat is added to and removed from the sheet through the belts by a heat transfer medium in contact with their outer surface. Equipment for continuous casting is described in U.S. Pat. No. 3,371,383 and British Pat. 1,300,400.

Free-radical initiators are incorporated in the casting mixture to decompose thermally at the polymerization temperature and provide free radicals for the initiation of the polymerization of the monomers, all of which polymerize by a free-radical chain mechanism. To be useful the initiators must decompose nearly completely at the polymerization temperature within the polymerization time. Excess initiator after polymerization is undesirable for economic reasons, and can be a source of instability for the polymer in subsequent thermal processing. Some initiator must be present at all times during the polymerization to provide a source of free radicals. Initiators which are usable include organic peroxides and peroxyesters with 10-hour half-lives in the range 25°–105° C. and one minute half-lives in the range 75°–160° C.

Initiator concentrations and polymerization temperatures should be adjusted so that the polymerization time to maximum exothermic heat of reaction is kept under 80 minutes, both for economic use of the equipment and for optimization of the impact strength with control of particle size in the 1–5 micron range. Very low initiator concentrations, coupled with low reaction temperature can lead to unsatisfactory impact strength and larger-than-desired rubber particles as well as a very slow polymerization. An increased initiator level increases the rate of polymerization so that there is less opportunity for the rubber particles precipitating during the polymerization to coalesce. Also it is quite possible that a limited degree of hydrogen abstruction grafting takes place in the presence of peroxide, which tends to stabilize the smaller particles, preventing their coalescence during polymerization. One or more peroxide initiators totaling at least 0.2% and up to about 2.0% should be present to assure good impact strength and particle size control in the range 1–5 microns with minimal risk of latent activity in the finished product.

EXAMPLE I

A mixture of the following was made up in a 2-liter glass reactor and stirred at 400 rpm for four hours:

| | |
|---|---|
| Methyl Methacrylate | 428 g |
| Styrene | 48 g |
| Butyl Acrylate | 36 g |
| Triisooctyl Phosphite | 2.4 g |
| Polyethylene Glycol Dimethacrylate, ("Chemlink 600") | 9.0 g |
| Kraton G1650 | 72 g |

Then, 1.2 g decanoyl peroxide and 2.0 g 75 percent t-butyl peroxypivalate were added and stirred for five minutes.

The viscosity at this point was 560 centipoise. The mixture was cast between two 14 in.×14 in. stainless-steel plates spaced 0.145 in. apart after degassing at 3–5 Torr for twenty minutes. The plates were immersed in a water bath at 77° C. for 44 minutes. The mixture was transferred to an oven at 120° C. for 36 minutes. An exotherm was observed in the oven on heat-up. A casting of thickness averaging 0.119 in. was obtained. The Gardner impact was 19.8 in.-1 b and the haze was 10.9 percent. The particle size of the rubber appeared to be about 3 microns by electron and light microscopy.

A second casting made with the same formulation as the first was cured in the bath at 77° C. for 65 minutes. An exotherm was noted when the casting temperature rose 7° C. above the bath temperature at 62 minutes. No exothermic heating was observed during the 23-minute oven cure at 120° C. The following physical properties were obtained:

| | | | |
|---|---|---|---|
| Tensile Strength at Break | 2325 psi | Rockwell R | 77 |
| Elongation at Break | 22.4% | DTUL (264 psi) | 145° F. |
| Tensile Modulus | 101,000 psi | Vicat Softening Point | 200° F. |

A piece of commercial acrylic without an impact modifier cast in a similar manner as a control (see U.S. Pat. No. 3,371,383 for a description of the endless belt casting machinery) had a Gardner impact of 3.0 in.-1 b and a haze of 2.2 percent.

Other impact castings were prepared, and data on them are presented in Table I.

Typical molecular weights of useful Kraton products may be seen in Table II.

TABLE 1

| % Kraton G1650: | | 8 | | 12 | |
|---|---|---|---|---|---|
| % Butyl Acrylate: | | 0 | 6 | 0 | 6 |
| | % Styrene 0 | | | | |
| Gardner, in.-lb | | | 7.2 | 7.0 | |
| | | | W .015% ndm Very Hazy | Very Hazy | |
| | 5.0–5.9 | | | | |
| Gardner, in.-lb | | | | 29.4 | 9.9 |
| Haze, % | | | | 4.8 | 2.7 |
| | 7.5–8.6 | | | | |
| Gardner, in.-lb | | 5.3 | 3.3 | 25.6 | 19.8 |
| Haze, % | | 11.0 | 16.7 | 45.6 | 10.9 |
| Tensile, psi | | 4770 | 4550 | 3455 | 2325 |
| Modulus, psi | | 279,000 | 248,000 | 149,000 | 101,000 |
| Elongation, % | | 11.8 | 15.9 | 24.1 | 22.4 |
| Rockwell R | | 105.3 | | 88.3 | 77 |
| DTUL, °F. | | 185 | | 164 | 145 |
| Vicat, °F. | | 228 | | 224 | 200 |

TABLE 1-continued

| | 11 | |
|---|---|---|
| Gardner, in-lb | | 19.8 |
| Haze, % | | 13.2 |

| Effect of Kraton Type | | | |
|---|---|---|---|
| Styrene 5.6% | Butyl Acrylate 0% | | Kraton 12.0% |
| | Kraton G1650 | Kraton G1651 | Kraton G1652 |
| Gardner, in-lb | 29.4 | 15.0 | 8.3 |
| Haze, % | 4.8 | 17.6 | 4.9 |

TABLE II
Molecular Weight Data on Kraton G

| | $\overline{Mw}$ | $\overline{Mn}$ | Styrene/ Rubber Ratio | Styrene Chain Length 2/molecule on $\overline{Mw}$ | Rubber Chain Length on $\overline{Mw}$ |
|---|---|---|---|---|---|
| Kraton G1650 | 88500 | 75900 | 28/72 | 12390 | 63720 |
| Kraton G1651 | 129900 | 96300 | 33/67 | 21433 | 87033 |
| Kraton G1652 | 67900 | 55400 | 29/71 | 9845 | 48209 |

Determined in triclorbenzene at 143° C. by gel permeation chromatography and calibrated with polypropylene standards.

A further example was prepared with ethylene-propylene rubber in addition to Kraton.

EXAMPLE II

Casting with Ethylene-Propylene Rubber

| Methyl Methacrylate | 447 g |
|---|---|
| Styrene | 30 g |
| Kraton G1650 | 72 g |
| Eugenol | .06 g (inhibitor) |
| Mixture heated to 60° C. - Kraton dissolved. | |

Then 36 grams Epcar 405 ethylene-propylene rubber were added and dispersed for three hours. Solution did not occur but most of the ethylene-propylene rubber dispersed. The mixture was cooled to about 30° C. At this point the viscosity was 500 centipoises. The following were then added:

| Triisooctyl Phosphite | 2.4 g |
|---|---|
| Polyethylene Glycol Dimethacrylate Mw 600 | 9.0 g |
| t-Butyl Peroxypivalate 75% | 2.0 g |
| Decanoyl Peroxide | 1.2 g |

The mixture degassed under vacuum and cast between two stainless steel plates 14"×14" held about 50 minutes in a water bath at 77° C. with a maximum exotherm at 45 minutes and in an air oven 23 minutes at 121° C. After cooling to room temperature, a casting 0.137 inches thick was obtained which was opaque with a Gardner impact of 63 in.-lb.

EXAMPLE III

Casting mixtures were made up as follows (numbers refer to parts by weight):

| Methyl Methacrylate | 78.5 |
|---|---|
| Styrene | 8.0 |
| Triisooctyl Phosphite | 0.4 |
| Polyethylene Glycol Dimethacrylate | 0.01 |
| Cyasorb 5411 | 0.0 or 0.3 |
| Irganox 1076 | 0.0 or 0.3 |
| Zelec NE | 0.01 |
| Eugenol | 0.004 |

These materials were heated under nitrogen to 50° C. with agitation and 12 parts Kraton added as indicated in Table III, either Kraton G1650 (hydrogenated) or Kraton D1101 (unhydrogenated). After one hour of agitation, solution was complete and the mixture was cooled to 27° C., and initiators added.

| t-Butyl Peroxypivalate (75%) | 0.2 |
|---|---|
| t-Butyl Peroxyneodecanoate (75%) | 0.2 |
| Decanoyl Peroxide | 0.1 |

The solution was degassed under vacuum for 20 minutes, (10 Torr or less total pressure), and poured between two stainless steel plates for casting. Water bath times at 82° C. were variable; all were finished in an oven at 121° C. for 26 minutes.

Samples were aged 1000 hours in an Atlas Xenon arc oven weathermometer, with borosilicate glass inner and outer filters and water sprays on 18 minutes out of 120 minutes.

Results are presented in Table III. It will be seen from Table III that the impact strength of the hydrogenated rubber-containing materials has outstanding endurance, particularly as compared to the unhydrogenated rubber containing formulations. Moreover, the sheet was clear, while the D1101-containing formulation had a bluish haze.

TABLE III

| Kraton Type | G1650 | G1650 | G1650 | D1101 | D1101 | D1101 |
|---|---|---|---|---|---|---|
| Cyasorb 5411 | 0.3 | 0.3 | 0.0 | 0.3 | 0.3 | 0.0 |
| Irganox 1076 | 0.3 | 0.0 | 0.0 | 0.3 | 0.0 | 0.0 |
| Viscosity cp | 11.5 | 9 | 11 | 198 | 260 | 180 |
| Time to Max. Exotherm Min. | 45 | 42 | 40 | 39 | 38 | 36 |
| Max. Exotherm °C. | 97 | 113 | 116 | 94 | 95 | 96 |
| Time in Water Bath Min. | 54 | 50 | 45 | 44 | 55 | 47 |
| Particle Size Microns | 1-1.5 | 2-5 | 1-3 | 1-5 | 1-5 | 1-2 |
| Gardner Impact | | | | | | |

TABLE III-continued

| Kraton Type | G1650 | G1650 | G1650 | D1101 | D1101 | D1101 |
|---|---|---|---|---|---|---|
| in.-lb. | | | | | | |
| 0 hr. | 54.7 | 56.0 | 59.5 | 88.8 | 110.9 | 105.1 |
| 250 hr. | 42.0 | 62.4 | 63.0 | 77.1 | 52.0 | 44.0 |
| 500 hr. | 30.9 | 59.3 | 58.2 | 75.0 | 41.5 | 11.2 |
| 1,000 hr. | 38.0 | 60.6 | 32.7 | 19.0 | 21.0 | 9.0 |
| Haze % | | | | | | |
| 0 hr. | 14.7 | 10.2 | 14.1 | 11.6 | 8.7 | 11.4 |
| 250 hr. | 19.8 | 16.4 | 14.3 | 10.5 | 8.1 | 9.5 |
| 500 hr. | 21.2 | 13.3 | 12.6 | 11.1 | 9.0 | 10.9 |
| 1,000 hr. | 27.7 | 15.3 | 11.4 | 12.7 | 11.9 | 10.3 |
| Thickness in. | .178 | .196 | .193 | .183 | .179 | .184 |
| Appearance | Clear | Clear | Clear | Blue Haze | Blue Haze | Blue Haze |

(no change on aging)

EXAMPLE IV

Castings were prepared as in Example III except as noted.

TABLE IV

Effect of Initiator Concentration and Temperature on Impact Strength and Particle Size

| | | | | |
|---|---|---|---|---|
| Base | Methyl Methacrylate | | | 79.4 |
| | Styrene | | | 5.6 |
| | Triisooctyl Phosphite | | | 0.4 |
| | Polyethylene Glycol Dimethacrylate | | | 0.01 |
| | Zelec NE | | | 0.01 |
| | Cyasorb 5411 | | | 0.3 |
| | Irganox 1076 | | | 0.3 |
| | Kraton G1650 (dissolved at 50° C.) | | | 12.0 |
| Variables | Eugenol | 0.01 | 0.01 | 0.004 |
| | t-Butyl Peroxyneodecanoate 75% | 0.0 | 0.0 | 0.20 |
| | t-Butyl Peroxypivalate 75% | 0.12 | 0.12 | 0.20 |
| | Decanoyl Peroxide | 0.06 | 0.06 | 0.20 |
| | Bath Temperature ° C. | 77 | 77 | 82 |
| | Time to Max. Exotherm Min. | 95 | 96 | 31 |
| | Max. Polymer Temperature ° C. | 85 | 87 | 100 |
| Results | Gardner Impact in.-lb | 10.5 | 18.0 | 55.5 |
| | Thickness in. | 0.173 | 0.181 | 0.188 |
| | Particle Size Microns | 5–10 | 4–10 | 1–3 |
| | Haze % | 8.0 | 7.3 | 30.7 |
| | Appearance | Blue Haze | Blue Haze | Blue Haze |

Table IV illustrates the importance to the impact strength and particle size of maintaining initiator concentrations of at least 0.2 percent peroxide initiator, and of maintaining polymerization conditions so that the maximum exotherm may be reached in 80 minutes or less. In the first two cases, where the total active initiator level was 0.15% and the time to maximum exotherm was about 95 minutes, a product with much larger rubber particles and much lower impact strength than in the third case where the polymerization conditions were within the recommendations of this specification, with a total initiator level of at least 0.5 percent by weight of the total mixture and a time to maximum exotherm of 31 minutes.

I claim:

1. A casting syrup for making an impact-modified polymethylmethacrylate comprising about 0.1% to about 20% styrene, about 69 to about 87% methyl methacrylate, about 0.2% to about 2.0% of a peroxide initiator, and about 8 to about 14% of an ABA block copolymer having a weight ratio of A:B monomer of about 1:2 to about 1:3 wherein A is a chain of polystyrene, and B is a block of hydrogenated polybutadiene, and up to about 10% ethylene-propylene rubber.

2. The syrup of claim 1 where the weight-average molecular weight of the block copolymer is in the range of about 50,000 to about 90,000.

3. Syrup of claim 1 including up to about 3% of a diunsaturated cross-linking agent.

4. Syrup of claim 1 wherein the styrene content is about 4% to about 11%.

5. Syrup of claim 1 wherein the styrene content is about 5% to about 8%.

6. Method of making an impact-modified polymethylmethacrylate comprising casting the syrup of claim 1 under polymerizing conditions wherein the maximum exotherm is reached in 80 minutes or less.

7. An impact-modified polymethylmethacrylate made by casting the syrup of claim 1 under polymerizing conditions wherein the maximum exotherm is reached in 80 minutes or less.

* * * * *